United States Patent

Niho et al.

[11] Patent Number: 5,184,134
[45] Date of Patent: Feb. 2, 1993

[54] FAST PHASE DIFFERENCE AUTOFOCUS

[75] Inventors: Yoji G. Niho, Rancho Palos Verdes; Eric W. Day, Van Nuys; Tammy L. Flanders, Playa Del Rey, all of Calif.

[73] Assignee: Hughes Aircraft Company, Los Angeles, Calif.

[21] Appl. No.: 799,514

[22] Filed: Nov. 27, 1991

[51] Int. Cl.$^5$ .............................................. G01S 13/90
[52] U.S. Cl. ......................................................... 342/25
[58] Field of Search ............................................ 342/25

[56] References Cited

U.S. PATENT DOCUMENTS

| | | | |
|---|---|---|---|
| 4,219,811 | 8/1980 | Herman et al. | 342/25 |
| 4,771,287 | 9/1988 | Mims | 342/25 |
| 4,924,229 | 5/1990 | Eichel et al. | 342/25 |
| 4,999,635 | 3/1991 | Niho | 342/25 |

*Primary Examiner*—T. H. Tubbesing
*Attorney, Agent, or Firm*—L. A. Alkov; W. K. Denson-Low

[57] ABSTRACT

A phase difference autofocus method that only requires one FFT for estimating a phase error in the entire synthetic array radar data. The phase difference autofocus method of the present invention automatically and efficiently estimates phase errors from radar signals, allowing a well focused SAR image to be produced. The present method comprises the following steps. First, each range bin is divided into two subarrays. Next, the two subarrays are complex-conjugate multiplied together to produce a cross spectrum of the two submaps produced by the subarrays. Then, the phases of each cross spectrum are aligned with an accumulated sum of the cross spectrums from previous processed range bins. The phase aligned cross spectrum is then added to the accumulated cross spectrum sum. All range bins are processed to get a final cross spectrum sum. Next, a single FFT is performed on the final cross spectrum sum to produce the cross correlation function. Then, the cross correlation function is magnitude-detected. Since the location of the peak of the cross correlation function is proportional to the phase error, a phase error estimate is obtained. Finally, the phase error correction signal is produced for the entire synthetic array radar data. Since only one FFT is performed during autofocus processing, the method is relatively fast.

8 Claims, 2 Drawing Sheets

FAST PHASE DIFFERENCE AUTOFOCUS

BACKGROUND

The present invention relates to synthetic array radar (SAR) signal processing, and more particularly, to a phase difference autofocus method for use in such SAR signal processing.

Many real-time SAR radar products require autofocus methods. In an existing phase difference method developed by the assignee of the present invention, an FFT must be done on many range bin of the image. This method is disclosed in U.S. Pat. No. 4,999,635, for "Phase Difference Autofocusing for Synthetic Aperture Radar Imaging," assigned to the assignee of the present invention. One disadvantage of this method is the large number of FFTs required to implement it.

By way of introduction, in the basic phase difference method described in the U.S. Pat. No. 4,999,635, the relative drift between two subimages is estimated without actually forming the subimages. Subarrays are simply mixed and an FFT filter bank is formed from a resulting product. The FFT filters are then detected to form a phase difference autofocus functional. The drift $\tau_{xy}$ is obtained by finding the location of the peak in the autofocus functional. In order to reduce a statistical noise in estimating the underlying phase errors, this process of forming the autofocus functional is repeated over many range bins. The drift $\tau_{xy}$ is estimated from the autofocus functional that is integrated over range bins.

The prior art phase difference autofocus method can be summarized in the following steps. A full array from each range bin is divided into two subarrays X, Y. Then, the two subarrays are complex-conjugate multiplied together to produce a cross spectrum of the two sub-maps produced by the subarrays. Next, after amplitude weights have been applied, an FFT is performed on the cross spectrum to produce the complex cross correlation function. One FFT is performed on the subarray complex conjugate product during each range bin processing. If M denotes the length of the subarrays, then each range bin process results in M*log2(M) complex multiplies. For simplicity assume an M point FFT is performed. Then, the cross correlation function is magnitude-detected. The magnitude-detected cross correlation function is then summed across range bins to to produce a summed cross correlation function. Next, the location, $\tau_{xy}$, of the peak of the summed cross correlation function, which is proportional to the residual quadratic phase error, is found. Finally, the center-to-end quadratic phase phase error, $\phi_q$, is obtained by multiplying $\tau_{xy}$ with a conversion factor. To summarize, one FFT operation is required to produce FFT filters for each each range bin. Detected FFT filters are then integrated over range bins. Detection operation is required since those FFT filters can not be coherently added over range bins.

In the cross spectrum derived from the complex-conjugate multiplication step, the predominate frequency is proportional to the residual quadratic phase error found in the original full array. The cross spectrum is not averaged in the prior phase difference method because the initial phase of the predominant frequency is different for each range bin. The magnitude detection of the cross correlation function aligns the data before summation across range bins in this prior phase difference autofocus method.

Accordingly, a more computationally efficient autofocus method is therefore highly desirable for many existing real-time SAR radar products. Since FFTs require extensive computations, a reduction in the number of FFTs substantially reduces the computation time. In real-time systems, minimization of computation time is not only desirable but also essential.

SUMMARY OF THE INVENTION

In order to overcome the limitations of existing phase difference autofocus methods, and to provide a more computationally efficient autofocus method, a fast phase difference autofocus method has been developed that only requires one FFT for the entire SAR image. The phase difference autofocus method of the present invention automatically and efficiently estimates and removes phase errors from radar signals, allowing a well focused SAR image to be produced.

The present phase difference autofocus method comprises the following steps. First, a full array from each range bin is divided into two subarrays. The two subarrays are complex-conjugate multiplied together to produce a cross spectrum of the two sub-maps that would have been produced by the subarrays if compressed. Then, the phases of the cross spectrum are aligned with an accumulated sum of the cross spectrums from range bins already processed. This is accomplished by complex-conjugate multiplying the accumulated sum of the previous cross spectrums with the current cross spectrum to produce a second order product. All samples from this product are summed and the phase is extracted therefrom. A complex phasor having this phase is multiplied with the current cross spectrum to align the phase thereof. The phase aligned cross spectrum is then added to the accumulated sum of cross spectrums until all range bins are summed. All range bins are processed to produce a final cross spectrum sum. Since no FFTs are performed prior to this point, the method is relatively fast. Next, an amplitude weighting function is applied to the final cross spectrum sum and an FFT is performed to produce a cross correlation function. Then, the cross correlation function is magnitude-detected. The location of the peak of the cross correlation function is proportional to the phase error. The center-to-end quadratic phase error in the full array is obtained by multiplying the location of the peak by a conversion factor.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
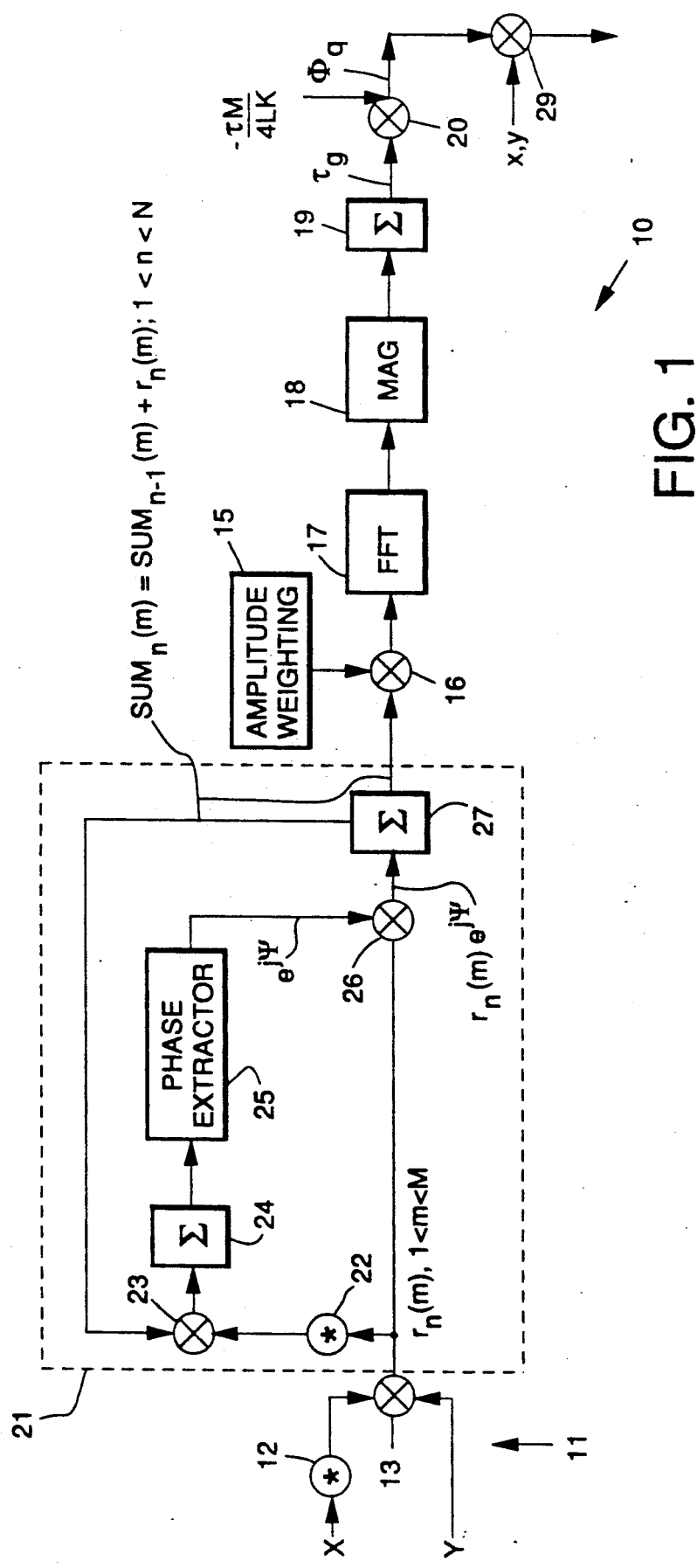
FIG. 1 shows a fast phase difference autofocus method in accordance with the present invention.

With reference to the drawing figures, FIG. 1 shows a phase difference autofocus method 10 in accordance with the present invention. In contrast to the prior art autofocus method described in the background section, in the present invention, the detection process may be eliminated from range bin processing in the prior art autofocus method by computing the proper phase shift for a cross spectrum in each range bin. Once the detection process is not needed, then the FFT and the integration operations can be interchanged since they are linear operations, thus eliminating the FFT operation from range bin processing. This substantially reduces the required computational load. This is the essence of the phase difference autofocus method 10 of the present invention that is depicted in FIG. 1.

More particularly, the fast phase difference method 10 comprises the following steps. First, a cross spectrum is formed 11 for each range bin. Here, a full array from each range bin is divided into two subarrays X, Y, such that two subarrays $X_n(m)$ and $Y_n(m)$ of length M are formed where n denotes a range bin index and m a sample index for each subarray. Then the subarray $X_n(m)$ is complex-conjugated using a conjugator 12 and multiplied with the subarray $Y_n(m)$ using a multiplier 13 to produce a cross spectrum $r_n(m)$, for $1<m<M$, of the two sub-maps that would have been produced by the subarrays X, Y if compressed. A set of process steps that produce an updated accumulated sum $SUM_n(m)$, or cross spectrum sum, are designed within a processing block identified by dashed box 21. Next, a phasor that will align the cross spectrum with the accumulated sum of cross spectrums from previously processed range bins is determined. The cross spectrum $r_n(m)$ is complex-conjugated 22 and is multiplied, using a multiplier 23, with the accumulated value $SUM_{n-1}(m)$ from the accumulator 27. Complex samples from the resulting product are summed in step 24 to form a complex quantity $S_n$. Its magnitude is normalized to unity to form a phasor $e^{j\psi n}$ in step 25. A phasor $e^{j\psi n}$ is produced to insure coherent integration of $r_n(m)$ over range bins. The cross spectrum $r_n(m)$ is multiplied with the phasor $e^{j\psi n}$ using a multiplier 26 to align its phase and then is added to $SUM_{n-1}(m)$ in the accumulator 27 to produce the updated accumulated sum $SUM_n(m)$.

Once cross spectrums are summed over all range bins in 27 to get the final cross spectrum sum, it is processed to produce a cross correlation function using an FFT. Since no FFT is performed prior to this point, the method is relatively fast. The final cross spectrum sum is multiplied 16 with an amplitude weighting function 15 and processed by a K-point FFT 17 to produce a complex cross correlation function. Next, the cross correlation function is magnitude-detected 18. The location $\tau_{xy}$ of the peak of the cross correlation function is determined in step 19. The value $\tau_{xy}$ is proportional to phase error. Finally, the value $\tau_{xy}$ is multiplied 20 by a scale factor $\tau_{xy}M^2/(4LK)$ to produce an estimated center-to-end quadratic phase error $\phi_q$. The phase error $\phi_q$ is multiplied with the range compressed complex VPH data (X, Y) in a multiplier 29 to remove the phase error from the synthetic array radar data.

More specifically, the fast phase difference autofocus method 10 performs coherent integration of the subarray second order product (an input to the FFT operation), thus substantially reducing the number of complex multiply operations required during FFTs. FIG. 1 shows that in the present phase difference autofocus method 10, only one FFT is performed on the sum of phase-aligned cross spectrums in step 17. This is accomplished by summing the conjugate products across all range bins and then performing one FFT in step 17. To insure coherent integration over range bins, each conjugate product is multiplied by the complex phasor $e^{j\psi n}$, an operation which takes 2*M complex multiplies, where M denotes the length of a subarray. Thus, if N denotes the number of range bins, the prior art phase difference autofocus method would require $N*M*\log_2(M)$ complex multiplies while the present fast phase difference autofocus method 10 requires only $N*2*M+M*\log_2(M)$. This results in a significant reduction of computational time.

The theory behind the phase difference autofocus method 10 of the present invention is as follows. Let the phase variation of the nth range bin be denoted by $RB_n(m) = \sigma_n e^{j2\pi(An+Bnm+Cm^2)}$. Then, two subarrays $X_n(m)$ and $Y_n(m)$ of length M are formed:

$$X_n(m) = RB_n(m-L) = \sigma_n e^{j2\pi(An+Bn(m-L)+C(m-L)^2)}$$

and $$Y_n(m) = RB_n(m+L) = \sigma_n e^{j2\pi(An+Bn(m+L)+C(m+L)^2)}.$$

Corresponding samples from the two subarrays are 2L points apart. The subarrays $X_n(m)$, $Y_n(m)$ are then multiplied (mixed) after taking the complex conjugate of the first subarray $X_n(m)$, which results in $r_n(m) = X^*(M)Y(m) = \sigma_n^2 e^{j2\pi(2BnL+4CLm)}$.

Then, $r_n(m)$ is summed across range bins and then only one FF is performed in step 17. To insure coherent integration, the phasor $e^{j\psi n}$ is computed and multiplied with $r_n(m)$. The theory behind summing the cross spectrums over range bins first and performing only one FFT in step 17 is as follows:

For the first range bin, the sum $SUM_1(m)$ is initialized with the first conjugate product $r_1(m)$ and is given by $SUM_1(m) = r_1(m) = \sigma_1^2 e^{j2\pi(2B_1L+4CLm)}$. For the second range bin, the complex conjugate product is given by $r_2(m) = \sigma_2^2 e^{j2\pi(2B_2L+4CLm)}$.

It is then desired to find the complex phasor $e^{j\psi 2}$ such that $r_2(m)e^{j\psi 2}$ can be coherently added to $SUM_1(m)$. To find such a phasor, the sum $S_2$ is formed which is given by $$\begin{aligned} S_2 &= \sum_m r_2^*(m) SUM_1(m) \\ &= \sum_{m=1}^{M} \sigma_2^2 e^{-j2\pi(2B_2L+4CLm)} \sigma_1^2 e^{j2\pi(2B_1L+4CLm)} \\ &= (\sigma_1\sigma_2)^2 M e^{j2\pi(2B_1L-2B_2L)} \end{aligned}$$

If we let $$e^{j\psi 2} = \frac{S_2}{|S_2|} = e^{j2\pi(2B_1L-2B_2L)}$$

then $$r_2(m)e^{j\psi 2} = \sigma_2^2 e^{j2\pi(2B_1L+4CLm)}.$$

The terms $\{r_2(m)e^{j\psi 2}\}$, $1<m<M$, have the same initial phase and slope as $\{SUM_1(m)\}$, $1<m<M$, and hence can be added coherently, in accordance with the equation $$\begin{aligned} SUM_1(m) &+ r_2(m)e^{j\psi 2} \\ &= \sigma_1^2 e^{j2\pi(2B_1L+4CLm)} + \sigma_2^2 e^{j2\pi(2B_1L+4CLm)} \\ &= (\sigma_1^2 + \sigma_2^2) e^{j4\pi B_1L} e^{j8\pi CLm} \\ &= SUM_2(m) \end{aligned}$$

In general, for the n-th range bin, the complex conjugate product has the form $r_n(m) = \sigma_n^2 e^{j2\pi(2BnL+4CLm)}$, and a complex quantity $S_n$ is formed using the equation $$S_n = \sum_m r_n^*(m) SUM_{n-1}(m)$$

Then $\psi_n$ is set to the phase of $S_n$ $$e^{j\psi_n} = \frac{S_n}{|S_n|}$$

and the sum becomes $$SUM_n(m) = SUM_{n-1}(m) + r_n(m)e^{j\psi_n}$$
$$= e^{j4\pi B1L_0 j8\pi CLm} \sum_{i=1}^{n} \sigma_i^2.$$

After processing all $N$ range bins, $$SUM_N(m) = e^{j4\pi B1L_0 j8\pi CLm} \sum_{i=1}^{N} \sigma_i^2.$$

In the phase difference autofocus method 10 of the present invention, the K-point FFT 17 is then performed on $\{SUM_N(m)\}$, $1 \le m \le M$. The output filters of the FFT 17 are detected by the magnitude-detector 18 and the location $\tau_{xy}$ of the peak response is determined in step 19. The center-to-end quadratic phase error $\phi_q$ is then determined by the equation $\phi_q = -2\pi \tau_{xy} M^2/(4LK)$ using the multiplier 20.

As shown, the quadratic phase error estimation involves forming two subarrays X, Y from each range bin, processing the complex-conjugate multiply product $\{X^*Y\}$, and determining the location of the peak in the cross correlation function. As described in the basic phase difference method disclosed in the U.S. Pat. No. 4,999,635, a simultaneous estimation of a quadratic and a cubic phase errors involves forming three arrays X, Y, Z from each range bin, processing two complex-conjugate-multiply products $\{X^* Z\}$, $\{Z^*Y\}$ and determining the location of the peak from the two cross correlation functions. The fast phase difference autofocus method of the present invention can be similarly extended to process two complex-conjugate-multiply products $\{X^* Z\}$, $\{Z^* Y\}$ for estimating a quadratic and a cubic phase error.

To evaluate the performance of the phase difference autofocus method 10, numerous sets of Advanced Synthetic Array Radar System (ASARS) spotlight mode data were processed offline. For each set of data, the quadratic and cubic phase errors were estimated by applying the fast phase difference autofocus method 10. These results were then compared with the estimates obtained by the basic phase difference autofocus method of the above-cited patent. Table 1 lists the pertinent scene information and the amount of phase errors detected by each method. For the majority of the test cases, both the fast phase difference autofocus method 10 and the prior art phase difference autofocus method disclosed in the U.S. Pat. No. 4,999,635 produced extremely well-focused imagery. The agreement of the phase error estimates was very high. In more than half the cases, the quadratic phase error estimates agreed within 100 degrees.

Figure 2:
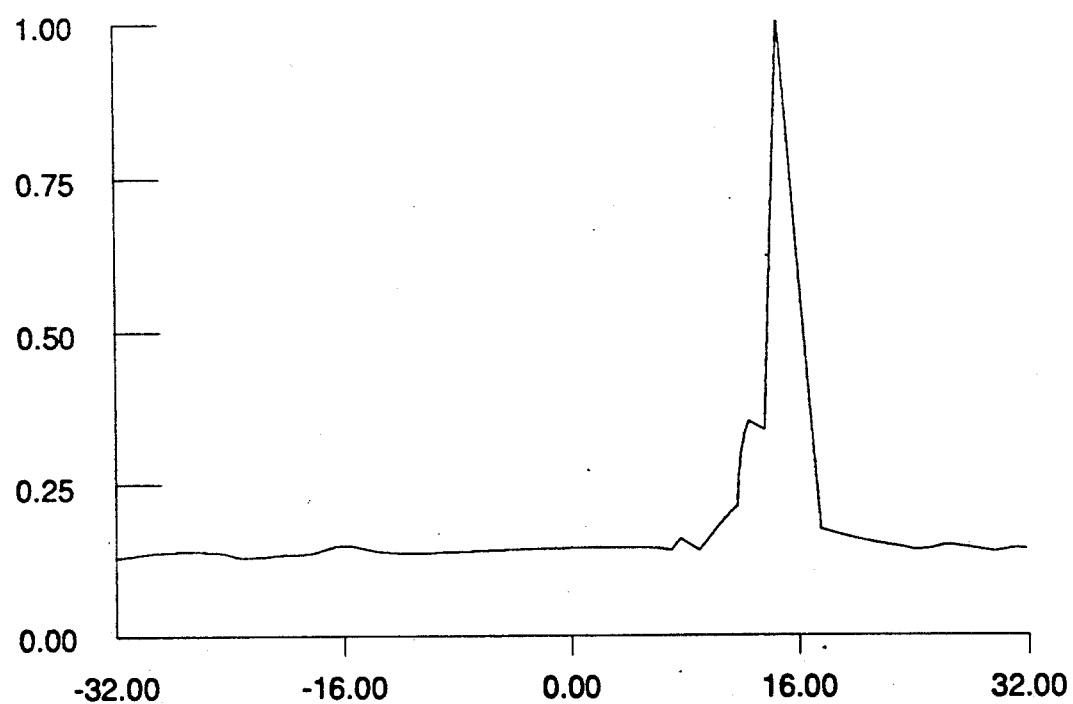
FIGS. 2 and 3 show autofocus functional outputs for a prior art method and the method of FIG. 1, respectively.
Figure 3:
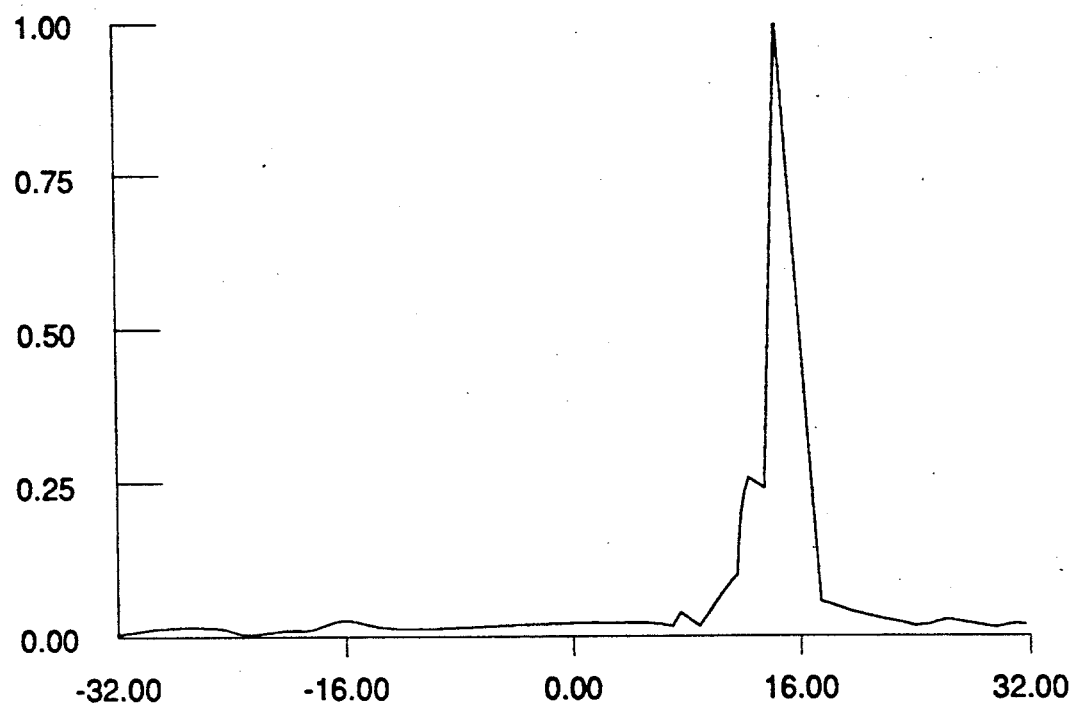

FIGS. 2 and 3 show the autofocus functional output by each method for scene 39 shown in Table 1. The peak response of both functionals is sharp and well-defined, and the interpolated peak locations yield quadratic phase estimates which agree within ten (10) degrees. It should be noted that the present phase difference autofocus method 10 has a higher target to clutter ratio than the prior art phase difference autofocus method. Also, since the fast phase difference autofocus method 10 reduces the number of FFTs required for processing, it greatly enhances the computational speed.

Thus there has been described a new and improved fast phase difference autofocus method for use in synthetic array radar (SAR) signal processing. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

TABLE 1

PHASE DIFFERENCE AUTOFOCUS PERFORMANCE COMPARISON

| | | | | Basic Phase Difference | | Fast Phase Difference | |
|---|---|---|---|---|---|---|---|
| Mission | Scene | Batch | Mode | Quad. (deg) | Cubic (deg) | Quad. (deg) | Cubic (deg) |
| 85-106 | 81 | 589 | SSPT3 | 172 | −54 | 227 | −123 |
| 85-106 | 83 | 591 | CSPT3 | −784 | 376 | −820 | 457 |
| 85-107 | 33 | 51 | SSPT1 | −3185 | −325 | −3366 | −290 |
| 85-107 | 53 | 79 | CSPT3 | −415 | 50 | −392 | 51 |
| OCF176 | 27 | 2029 | SSPT3 | −471 | 146 | −418 | 34 |
| OCF176 | 28 | 2030 | SSPT1 | −1183 | −261 | −1246 | −440 |
| OCF176 | 39 | 2041 | SSPT1 | 2405 | 42 | 2411 | 15 |
| 87SR41 | 6 | 160 | SSPT1 | 552 | 56 | 335 | −77 |
| 87SR41 | 22 | 184 | SSPT1 | 972 | −303 | 1049 | −706 |

What is claimed is:

1. A fast phase difference autofocus method for removing phase errors from synthetic array radar signals, said method comprising the steps of:
   dividing each range bin of the synthetic array radar data into two subarrays;
   complex-conjugate multiplying the two subarrays together to produce a cross spectrum;
   determining a complex phasor for the cross spectrum to align its phase so that the cross spectrum can be coherently added to the accumulated sum of cross spectrums from previously processed range bins;
   multiplying the cross spectrum with the complex phasor and adding it to the accumulated sum of cross spectrums from previously processed range bins;

repeating the previous three steps for all range bins to form the final cross spectrum sum from all range bins;

applying an amplitude weighting function to the final cross spectrum sum;

performing an FFT to the amplitude-weighted cross spectrum sum to produce a cross correlation function;

magnitude-detecting the cross correlation function and determining a peak location of the cross correlation function;

multiplying the peak location by a scale factor to compute a center-to-end phase error estimate signal; and generating a phase error correction signal and removing the phase error from the synthetic array radar data by multiplying the data with the phase error estimate signal.

2. The method of claim 1 wherein the step of the determining the complex phasor to align the phase of the cross spectrum comprises the steps of:

complex-conjugate multiplying the current cross spectrum and a previously accumulated sum of cross spectrums to produce a second order cross spectrum product;

summing all terms of the second order cross spectrum product to form a complex sample; and extracting the phase of the complex sample.

3. A phase difference autofocus method for removing phase errors from synthetic array radar data, said method comprising the steps of:

dividing a full array of each range bin in the synthetic array radar data into two subarrays;

complex-conjugate multiplying the the two subarrays together to produce a cross spectrum;

aligning the phases of a current cross spectrum with a presently accumulated cross spectrum sum by multiplying the current cross spectrum with a complex phasor and adding it to a presently accumulated cross spectrum sum;

adding the current phase aligned cross spectrum to the previously accumulated cross spectrum sum to update the cross spectrum sum;

whereby when all range bins have been processed, a final cross spectrum sum is produced;

applying an amplitude weighting function to the final cross spectrum sum;

performing an FFT on the amplitude-weighted cross spectrum sum to produce a cross correlation function;

magnitude-detecting the cross correlation function to detect a peak location of the cross correlation function;

multiplying the filter location of the peak by a scale factor to compute a center-to-end phase error estimate signal; and generating a phase correction signal using the phase error estimate signal and removing the phase error from the synthetic array radar data by multiplying the data with the phase estimate signal.

4. A phase difference autofocus method that removes phase errors from synthetic array radar data, said method comprising the steps of:

dividing a full array from each range bin of the synthetic array radar data into two subarrays $X_n(m)$, $Y_n(m)$ of length M;

complex-conjugate multiplying the two subarrays together to produce a cross spectrum $r_n(m)$;

computing a phasor $e^{jy_n}$ by complex-conjugate multiplying the cross spectrum $r_n(m)$ with the presently accumulated sum $SUM_{n-1}(m)$, adding all terms of the resulting product, and then extracting its phase $y_n$ to form the phasor $e^{jy_n}$;

integrating the phase aligned cross spectrum $r_n(m)$ $e^{jy_n}$ across all range bins to produce a cross spectrum sum comprising a summed value $SUM_n(m) = SUM_{n-1}(m) + r_n(m) e^{jy_n}$, applying an amplitude weighting function to the cross spectrum sum $SUM_N(m)$;

performing an FFT to the amplitude-weighted cross spectrum sum to produce a cross correlation function;

magnitude-detecting the cross correlation function to determine the location $t_{xy}$ of the peak response therein;

computing a quadratic phase error estimate $\phi_q = -2p\, t_{xy} M^2/(4LK)$;

generating a phase error correction signal $e^{j\phi_q(m/M)^2}$, $-M < m < M$; and removing the phase error from the synthetic array radar data by multiplying the data with the phase error correction signal.

5. A phase difference autofocus method that removes phase errors from synthetic array radar data, said method comprising the steps of:

dividing each range bin of the synthetic array radar data into two subarrays;

producing a cross spectrum of the two subarrays;

aligning the phases of each cross spectrum with an accumulated sum of cross spectrums;

adding the phase aligned cross spectrum to the accumulated cross spectrum sum;

processing all range bins to compute a final cross spectrum sum;

applying an amplitude weighting function to the final cross spectrum sum;

performing an FFT on the amplitude weighted cross spectrum sum to produce a cross correlation function;

magnitude-detecting the cross correlation function;

producing a phase error correction signal; and removing the phase error from synthetic array radar data by multiplying the data with the phase error correction signal.

6. A fast phase difference autofocus method for removing phase errors from synthetic array radar signals, said method comprising the steps of:

dividing each range bin of the synthetic array radar data into two subarrays;

complex-conjugate multiplying the two subarrays together to produce a cross spectrum;

determining a complex phasor for the cross spectrum to align its phase so that the cross spectrum can be coherently added to the accumulated sum of cross spectrums from previously processed range bins by:

complex-conjugate multiplying the current cross spectrum and a previously accumlated sum of cross spectrums to produce a second order cross spectrum product;

summing all terms of the second order cross spectrum product to form a complex sample; and extracting the phase of the complex sample;

multiplying the cross spectrum with the complex phasor and adding it to the accumulated sum of cross spectrums from previously processed range bins;

repeating the process over all range bins to form the final cross spectrum sum from all range bins;

applying an amplitude weighting function to the final cross spectrum sum;

performing an FFT to the amplitude-weighted cross spectrum sum to produce a cross correlation function;

magnitude-detecting the cross correlation function and determining a peak location of the cross correlation function;

multiplying the peak location by a scale factor to compute a center-to-end phase error estimate; and generating a phase error correction signal and removing the phase error from the synthetic array radar data by multiplying the data with the phase error correction signal.

7. A fast phase difference autofocus method generating a phase error correction signal that is used to remove phase errors from synthetic array radar signals, said method comprising the steps of:

dividing each range bin of the synthetic array radar data into two subarrays;

complex-conjugate multiplying the two subarrays together to produce a cross spectrum;

determining a complex phasor for the cross spectrum to align its phase so that the cross spectrum can be coherently added to the accumulated sum of cross spectrums from previously processed range bins;

multiplying the cross spectrum with the complex phasor and adding it to the accumulated sum of cross spectrums from previously processed range bins;

repeating the previous three steps for all range bins to form the final cross spectrum sum from all range bins;

applying an amplitude weighting function to the final cross spectrum sum;

performing an FFT to the amplitude-weighted cross spectrum sum to produce a cross correlation function;

magnitude-detecting the cross correlation function and determining a peak location of the cross correlation function;

multiplying the peak location by a scale factor to compute a center-to-end phase error estimate; and generating a phase error correction signal that is adapted to remove the phase error from the synthetic array radar data by multiplying the data with the phase error correction signal.

8. The method of claim 7 wherein the step of the determining the complex phasor to align the phase of the cross spectrum comprises the steps of:

complex-conjugate multiplying the current cross spectrum and a previously accumulated sum of cross spectrums to produce a second order cross spectrum product;

summing all terms of the second order cross spectrum product to form a complex sample; and extracting the phase of the complex sample.

* * * * *